(12) United States Patent
Earl et al.

(10) Patent No.: US 10,146,808 B2
(45) Date of Patent: *Dec. 4, 2018

(54) HIGHLY AVAILABLE CLUSTER AGENT FOR BACKUP AND RESTORE OPERATIONS

(71) Applicant: EMC IP HOLDING COMPANY LLC, Hopkinton, MA (US)

(72) Inventors: Min-Chih L. Earl, Redmond, WA (US); Matthew D. Buchman, Seattle, WA (US); Jerzy Gruszka, Lacey, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,071

(22) Filed: Dec. 12, 2017

(65) Prior Publication Data

US 2018/0101551 A1 Apr. 12, 2018

Related U.S. Application Data

(63) Continuation of application No. 13/799,696, filed on Mar. 13, 2013, now Pat. No. 9,842,124.

(51) Int. Cl.
*G06F 17/30* (2006.01)
*G06F 9/44* (2018.01)
*G06F 11/14* (2006.01)
*G06F 9/455* (2018.01)

(52) U.S. Cl.
CPC .......... *G06F 17/30289* (2013.01); *G06F 9/44* (2013.01); *G06F 9/45558* (2013.01); *G06F 11/14* (2013.01); *G06F 2009/45562* (2013.01); *G06F 2009/45579* (2013.01)

(58) Field of Classification Search
CPC ..................... G06F 11/1469; G06F 11/1458
See application file for complete search history.

(56) References Cited

U.S. PATENT DOCUMENTS

| | | | |
|---|---|---|---|
| 5,758,359 | A | 5/1998 | Saxon |
| 7,747,730 | B1 | 6/2010 | Harlow |
| 8,219,769 | B1 | 7/2012 | Wilk |
| 8,260,750 | B1 | 9/2012 | Gugick |
| 8,429,276 | B1 | 4/2013 | Kumar |
| 8,577,845 | B2 | 11/2013 | Nguyen et al. |
| 8,769,048 | B2 | 7/2014 | Kottomtharayil |
| 8,925,034 | B1 | 12/2014 | Tsaur |
| 8,959,509 | B1 | 2/2015 | Sobel |
| 9,275,060 | B1 | 3/2016 | Supekar |
| 2007/0220320 | A1 | 9/2007 | Sen |
| 2009/0300633 | A1 | 12/2009 | Altrichter |
| 2010/0332630 | A1* | 12/2010 | Harlow ................ H04L 41/048 709/221 |
| 2011/0276539 | A1 | 11/2011 | Thiam |
| 2012/0041927 | A1 | 2/2012 | Derk |
| 2012/0233419 | A1 | 9/2012 | Yamashita |

(Continued)

*Primary Examiner* — Loc Tran
(74) *Attorney, Agent, or Firm* — Workman Nydegger

(57) ABSTRACT

Systems and methods for backing up and restoring virtual machines in a cluster environment. A cluster agent that is cluster aware operates as an interface with the backup server. The cluster agent can locate the virtual machines being backed up or restored and coordinate with a local agent to perform the backup or restore of the virtual machines.

17 Claims, 3 Drawing Sheets

(56) References Cited

U.S. PATENT DOCUMENTS

| | | | |
|---|---|---|---|
| 2012/0278287 A1* | 11/2012 | Wilk | G06F 11/1464 |
| | | | 707/654 |
| 2012/0310896 A1 | 12/2012 | Freedman et al. | |
| 2013/0254402 A1 | 9/2013 | Vibhor et al. | |
| 2013/0262925 A1 | 10/2013 | Dhanalakoti | |
| 2013/0290265 A1 | 10/2013 | Hari | |
| 2014/0082167 A1 | 3/2014 | Robinson et al. | |
| 2014/0223012 A1 | 8/2014 | Agarwala | |

* cited by examiner

HIGHLY AVAILABLE CLUSTER AGENT FOR BACKUP AND RESTORE OPERATIONS

CROSS-REFERENCE TO RELATED APPLICATIONS

The present application is a Continuation of U.S. patent application Ser. No. 13/799,696, filed on Mar. 13, 2013 and issued on Dec. 12, 2017 as U.S. Pat. No. 9,842,124, which is hereby incorporated by reference in its entirety.

BACKGROUND OF THE INVENTION

1. The Field of the Invention

Embodiments of the present invention relate to backing up and restoring data. More particularly, embodiments of the invention relate to systems and methods for backing up and/restoring virtual machines in cluster environments.

2. The Relevant Technology

In conventional systems, data is often backed up by simply making a copy of the source data. To make this process more efficient, snapshot technologies have been developed that provide additional versatility to both backing up data and restoring data. Using snapshots, it is possible to backup data in a manner than allows the data to be restored at various points in time.

Because there is a need to have reliable data and to have that data available in real-time, emphasis is placed on systems that can accommodate failures that impact data. As computing technologies and hardware configurations change, there is a corresponding need to develop backup and restore operations that can accommodate the changes.

Cluster technologies (clusters) are examples of systems where reliable backup and restore processes are needed. Clusters provide highly available data, but are difficult to backup and restore for various reasons. For example, clusters often include virtualized environments. Nodes in the cluster can host virtual machines. When a portion (e.g., a virtual machine operating on a node) of a cluster fails, the cluster is able to make the data previously managed by that virtual machine available at another location in the cluster, often on another node. Unfortunately, the failover process can complicate the backup and restore operations.

More specifically, clusters often include cluster shared volumes (CSVs). Essentially, a CSV is a volume that can be shared by multiple nodes and by multiple machines. The inclusion of CSVs plays a part in enabling high availability. Because all nodes can access the CSVs, virtual machines instantiated on the nodes can migrate from one node to another node transparently to users.

In order to successfully backup a virtual machine that uses a CSV, it is necessary to have access to configuration information including the virtual hard disk (VHD) of the virtual machine. Conventionally, tracking which virtual machines are on which nodes and ensuring that the configuration data is current is a complex process. Knowing the node address, for example, may not result in a successful backup since the virtual machines can migrate to other nodes in the cluster.

More generally, the ability of virtual machines to migrate within a cluster can complicate the backup and restore processes and make it difficult to correctly determine configuration information for the virtual machines when backing up or restoring a virtual machine.

BRIEF DESCRIPTION OF THE DRAWINGS

In order to describe the manner in which the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Figure 1:
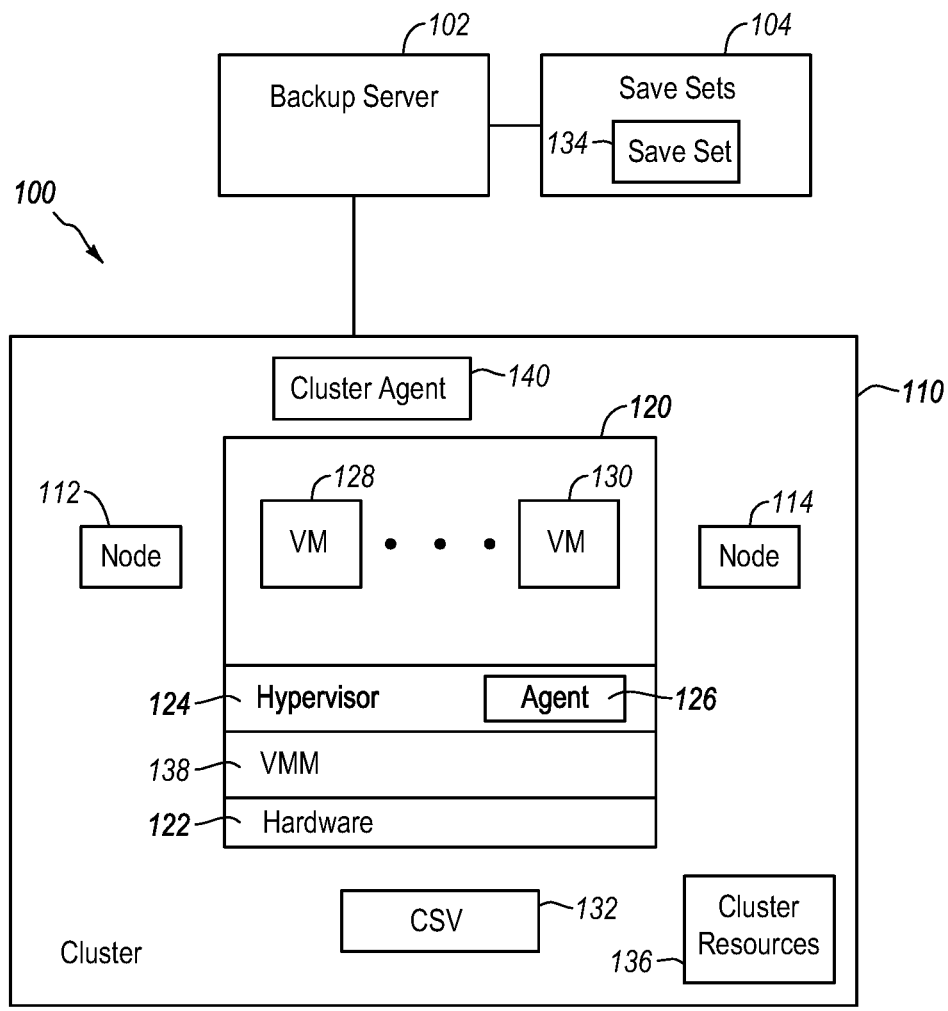
FIG. 1 illustrates a block diagram of an example of a cluster environment and of a backup system configured to backup and restore virtual machines operating in the cluster environment.

Embodiments of the invention relate to systems and methods for backing up and/or restoring virtual machines and/or data associated with virtual machines. Embodiments further relate to systems and methods for backing up and restoring virtual machines in a cluster environment. Embodiments further relate to backing up and restoring virtual machines in a cluster environment that includes cluster shared volumes (CSVs).

A computer cluster (cluster) is a group of devices that are configured to work together. The cluster typically includes one or more computing devices. Each computing device may be a node of the cluster. Each node may be, by way of example only, a server computer running server software or other computing device. Each node may also be configured with a virtual machine manager (VMM) or a hypervisor layer that enables one or more virtual machines to be implemented on each node.

A cluster can provide high availability and typically provides improved performance compared to a stand-alone computer. A cluster has the ability, for example, to adapt to problems that may occur with the virtual machines operating therein. For example, when a node fails, the cluster provides a failover procedure that enables another node to take over for the failed node. Virtual machines or operations of the virtual machines on the failed node may be taken up by other virtual machines on other nodes.

A cluster may also include cluster resources. Cluster resources exist on nodes in the cluster and can migrate between nodes in the cluster. A cluster resource can be a physical resource, a software resource or the like that can be owned by a node. Often, the cluster resource is owned by one node at a time. In addition, the cluster resource can be managed in the cluster, taken online and/or offline. Further, a cluster resource may also abstract the service being provided to the cluster. As a result, the cluster only understands that a cluster resource is available and can be used by any node in the cluster. A cluster resource is typically used by one node at a time and ownership of the cluster resource belongs to the node using the cluster resource. A cluster resource may have its own IP address and name, for example.

Virtual machines, which are also a type of cluster resource, in a CSV environment can migrate from node to node as previously stated. Advantageously, embodiments of the invention enable backup and restore processes to occur without requiring the backup server to know where the virtual machine resides during the backup interval. The cluster resource is configured to interface with the backup server and with a local agent operating on a node in the cluster.

By involving a cluster resource that has a network name and an IP address in the backup and restore operations, a backup server can contact the cluster resource without knowing any of the cluster node names or address. In addition, the cluster resource can also migrate from node to node and thereby provides high availability for backup and restore operations.

Embodiments of the invention relate to a cluster agent (which is an example of a cluster resource) that registers with a backup server. The cluster agent provides its IP address and network resource name at least to the backup server. Advantageously, a back and restore can be performed by selecting the account name registered by the cluster agent.

For example, to back up a virtual machine running in a CSV cluster environment, a backup may be scheduled through the account registered by the cluster agent. Then, the backup server can contact the cluster agent using its name or IP address. The name and IP address of the cluster agent is independent of other cluster resources. Advantageously, this allows the cluster agent can be contacted no matter on which node the cluster agent resides.

When the cluster agent receives the command to perform a backup of a virtual machine in the cluster, the cluster agent may determine where the virtual machine is located. Because the cluster agent is a cluster resource, it can query the location of the virtual machine identified for backup or restore. The command or workorder is then transmitted to a local agent. The local agent then performs the backup of the virtual machine. When the backup is completed, the local agent sends the status back to the cluster agent and the cluster agent reports the status to the backup server.

Advantageously, because the node of the virtual machine is determined at the time of performing the backup, it is possible to perform the backup even if the virtual machine migrates between the time of scheduling the backup and performing the backup.

A restore operation can be similarly performed. The backup server contacts the cluster agent with a restore workorder. The cluster agent locates the current node of the virtual machine and sends the workorder or the restore command to the local agent. The local agent performs the restore and reports the status of the restore back to the cluster agent, which reports the status back to the backup server.

In both the restore and backup operations, each node may have a local agent. Alternatively, a single local agent may be configured to effectuate the backup and restore operations for all virtual machines.

FIG. 1 illustrates an example of a computer system 100. The computer system 100 illustrated in FIG. 1 may include one or more networks or network configurations. The computer system 100 includes storage configured to store data of varying types (e.g., applications, email, video, image, text, database, user data, documents, spreadsheets, or the like or any combination thereof). The data may exist in the context of a virtualized environment. In the computer system 100, the data or a portion thereof or a virtual machine including the virtual machines virtual hard disk (VHD) can be backed up and restored by a backup server 102. The backup of the data may be continuous, periodically, on a requested or scheduled basis. The backup server 102 generates save sets 104 when performing backups. The save sets 104 correspond, in one example, to the virtual machines in the computer system 100.

The computer system 100 includes a computer cluster 110 (cluster 110). The cluster 110 includes one or more nodes, illustrated as node 112, node 114 and node 120. Each node includes or is associated with hardware. The node 120 is associated with hardware 122 in this example. The hardware 122 can include processors, network adapters, memory of various types, caches, and other chips that may be used in enabling the operation of the hardware 122. The hardware 112 may be a computing device running an operating system (e.g., a server computer) that is capable of supporting virtual machines.

In this example, the hardware 122 is configured to support the operation of the cluster 110. In the cluster 110, the nodes 112, 114, and 120 may each be associated with different hardware (e.g., each node may be a distinct or separate computing device). Alternatively, the nodes 112, 114, and 120 may be configured such that the hardware is shared or such that certain hardware, such as a hard disk drive, is shared. The nodes 112, 114, and 120 or the virtual machines instantiated thereon may utilize the same storage, processor group, network adapter, or the like or any combination thereof.

The hardware 122 of the cluster 110 may include one or more cluster shared volumes (CSVs). The CSV 132 is an example of a cluster shared volume. The CSV 132 is a volume configured such that more than one virtual machine (discussed below) can use the same physical disk even if not on the same node. In addition, the virtual machines that may be using the CSV 132 can move to different nodes (e.g., during failover or for another reason) independently of each other. In one example, the various virtual machines operating in the cluster 110 can move from or transfer one node to another node for different reasons.

FIG. 1 further illustrates that a virtual machine manager (VMM) 138 and a hypervisor 124 are installed on or are operating on the node 120. The hypervisor 124 and the VMM 138 are typically software that cooperate to create and manage virtual machines on a host machine or on host hardware such as the hardware 122 of the node 120. Each of the nodes 112 and 114 may also include a hypervisor 124 and a VMM 138. The hypervisor 124 operates to abstract the hardware 122 in order to instantiate virtual machines.

In FIG. 1, the node 120 supports virtual machines represented as virtual machines 128 and virtual machine 130. Each virtual machine 128 and 130 may include or be associated with one or more virtual hard disk (VHDs). Although reference is made to VHDs, one of skill in the art can appreciate that other formats may be used (e.g., VHDx). A VHD may be, in one example, a file (e.g., *.vhd) that is configured to be used as a disk drive for a virtual machine or that is a representation of a virtual machine. In one example, the virtual machines 128 and/or 130 can be encapsulated in a file or in a file structure. The VHD of the virtual machine 128 and the VHD of the virtual machine 130 may both reside on the CSV 132.

FIG. 1 further illustrates the backup server 102. The backup server 102 may communicate with the cluster 110. The backup server 102 is configured to generate save sets 104. The save set 134 is an example of a save set. Each save set in the save sets 104 may be a backup of one or more of the virtual machines operating in the cluster 110 as previously stated.

In this example, the save set 134 may be a backup of the virtual machine 128. The save sets 104 in general correspond to backups of the virtual machines in the cluster 110. The save sets may be configured such that the virtual machines (e.g., the virtual machines 128 and 130) can be restored at any point in a given time period. Embodiments of the invention also enable the save set 134 to be restored at a location that may be different from the location at which the backup was performed. For example, a backup of the virtual machine 128 may be restored to the node 112, to another cluster, or to a stand-alone machine.

FIG. 1 further illustrates a cluster agent 140, which is an example of a cluster resource 136 The cluster agent 140 may also be a cluster group. A backup of the virtual machine 128 (or portion thereof) or of the cluster 110 can be initiated in various ways (e.g., periodically, on request, or the like). The command or workorder, however, typically begins when the workorder is received by the cluster agent 140.

The cluster agent 140 can coordinate with a local agent 126 when performing a backup or a restore. Advantageously, this relieves the backup server 102 from knowing which nodes are associated with which virtual machines and provides transparency from a user perspective. Because the cluster agent 140 may be a cluster resource, the cluster agent 140 can independently operate in the cluster 140 to query the cluster to locate and interact with various virtual machines as necessary.

In one example, the cluster agent 140 represents the cluster 110 as a single entity even when there are multiple nodes in the cluster 110. In this sense, the backup or restore of a virtual machine can proceed as if the backup server were backing up a single node. The cluster agent 140 is configured to manage the virtual machines and handle migration of the virtual machines transparently to a user. Further, the cluster agent 140 is highly available to perform operations in the CSV cluster environment. As previously stated, the backup server 102 can communicate with the cluster agent 140 regardless of where the cluster agent 140 is running since the cluster agent has is own network name and IP address. The cluster agent 140 can access and manage cluster virtual machines independently the locations of the virtual machines' resources.

The cluster agent 140 is configured as a highly available cluster resource is able to tolerate node failure and is capable of migrating to an online node when necessary. This ensures that the cluster agent 140 is highly available for backup and restore operations.

In one example, a single local agent 126 can be instantiated on one of the nodes. The local agent 126 can receives commands or workorders from the cluster agent 140 and can coordinate a backup or restore of any virtual machines owned by the node on which the local agent 126 is installed. Further, the cluster agent 140 can operate on any of the nodes in the cluster 110. Alternatively, each node in the cluster 110 may be associated with a local agent and each local agent may be able to coordinate with the cluster agent 140.

Figure 2:
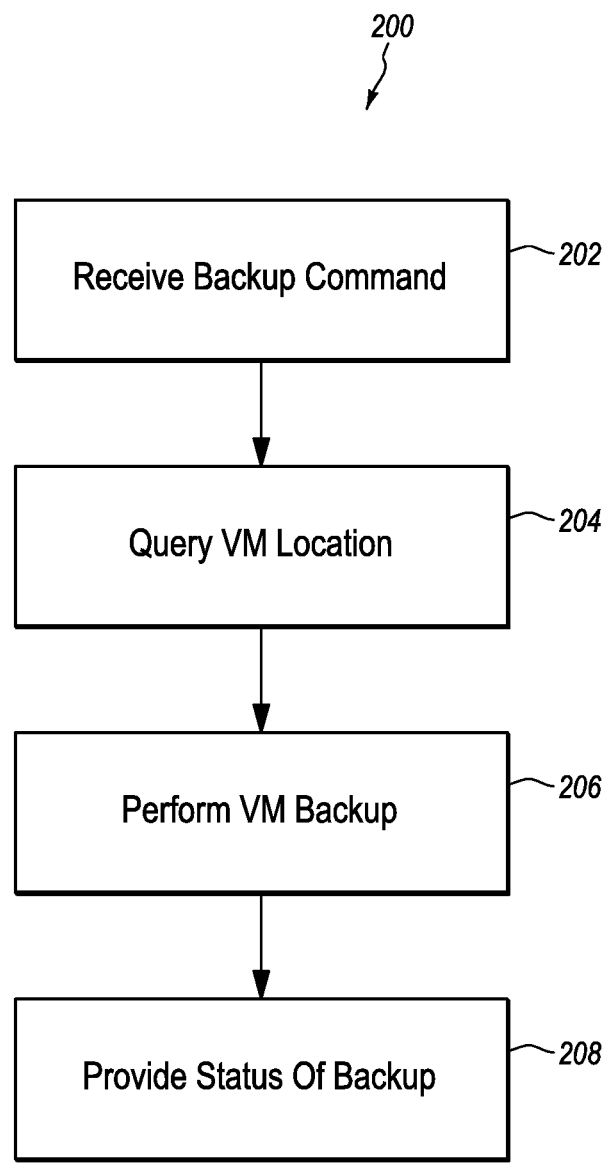
FIG. 2 illustrates an example of a method for backing up a virtual machine in a cluster environment.

FIG. 2 illustrates a method for performing a backup of a virtual machine in an environment such as a cluster. The method 200 may begin when a backup server calls for backup or issues a command (e.g., a workorder) for backup in block 202. The call or command for backup may be delivered to and received by the cluster agent in block 202. The command may identify the virtual machine to be backed up. However, the backup server may not know the location of the virtual machine or on which node the virtual machine is operating.

In block 204, the cluster agent can query the cluster to determine the location of the virtual machined identified in the workorder. Because the cluster agent is running as a cluster-wide resource, the cluster agent can query the location of the virtual machine. Once the location of the virtual machine is determined, the backup of the virtual machine is performed in block 206.

When a backup of the virtual machine is performed, configuration data of the virtual machine and/or the cluster may be included in the save set. This facilitates the restoration of the virtual machine when a redirected restore or other restore is performed.

The backup of the virtual machine may be handled by the cluster agent itself. Alternatively, the cluster agent may coordinate with a local agent and the local agent may coordinate the backup of the virtual machine. In one example, the local agent may reside on the same node as the virtual machine being backed up. When backing up the virtual machine, the local agent may ensure that a snapshot is taken of the virtual machine or of the CSV used by the virtual machine. By taking a snapshot of the CSV, the virtual machine can be properly backed up.

The local agent may interface with a local service (e.g., a snapshot service) to ensure that a snapshot of the virtual machine is performed during the backup procedure. The snapshot may be performed by the cluster or by the relevant node in the cluster or by the local agent in conjunction with the local snapshot service. The snapshot may be stored in a snapshot directory. At the same time, the configuration information may also be included in the save set of the virtual machine, which is an example of a backup of the virtual machine.

Once the backup is completed, the local agent provides a corresponding status to the cluster agent in block 208. The cluster agent may also provide the status to the backup server as well. The cluster agent may consolidate the backup status sent from each cluster node and report the backup status from each node back to the backup server.

Because the location of the virtual machine is determined at the time of performing the backup by the cluster agent, the backup operation is not adversely affected if the virtual machine migrates to another node between the time that the backup of the virtual machine is scheduled and the time at which the backup operation is performed.

Figure 3:
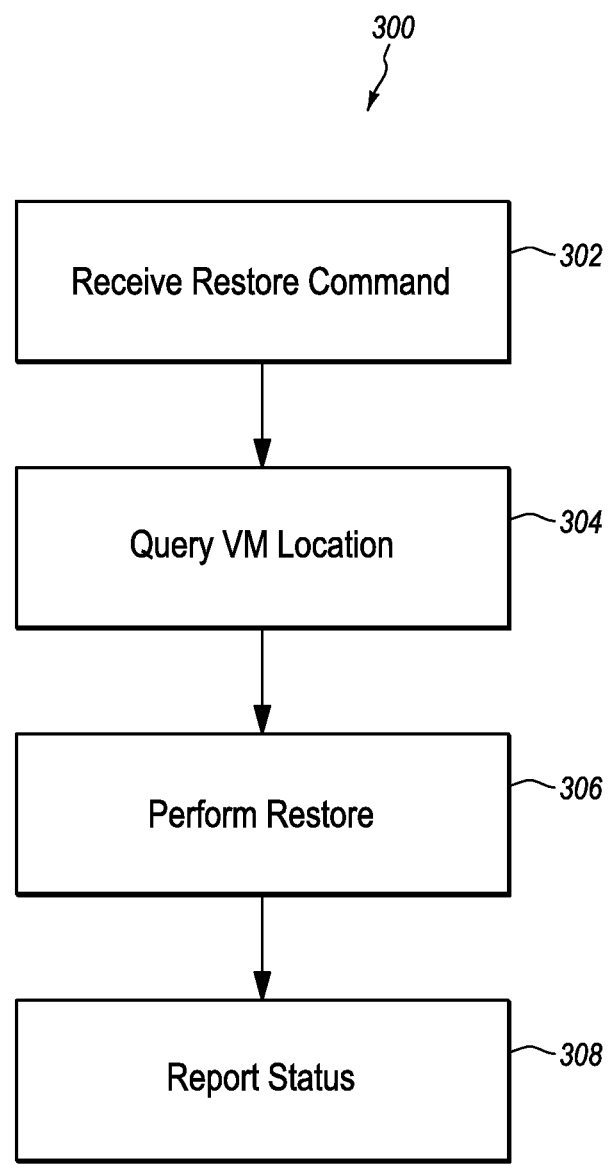
FIG. 3 illustrates an example of a method for restoring a virtual machine in a cluster environment.

FIG. 3 illustrates an example method for restoring a save set in order to restore a virtual machine. In block 302, a call (e.g., a workorder) for restoring a virtual machine is made. The virtual machine corresponds to a save set. The workorder generally originated with the backup server, which sends the workorder to the cluster agent.

In block 304, the destination of the virtual machine is determined. The destination may depend on whether the virtual machine is still present in the cluster. For example, the cluster agent locates the current node of the virtual machine and determines that the current node on which the virtual machine is instantiated is the destination of the restore operation. If the virtual machine is no longer available in the cluster, then the node that owned the virtual machine at backup time is used as the destination. If such node does not exist, then the node on which the cluster agent is operating may be used as the destination.

One of skill in the art can appreciate that the virtual machine could be restored on another node in light of the ability of the cluster to migrate virtual machines from one node to another. Once the destination is determined, the workorder is sent to the local agent of the appropriate node. Alternatively, for an embodiment that includes a single local agent, the destination node may also be provided to the local agent.

In block 306, the restore is performed. More specifically, the virtual machine is restored to the identified destination. This may include adjusting the restore process to account for changes between the configuration of the node, the virtual machine, and/or the cluster and the configuration included in the save set from which the virtual machine is restored.

For example, the configuration of the destination may be compared with the configuration information that was included with the save set. Adjustments may be made to the save set or to the metadata in order to ensure that the restoration of the virtual machine is compatible with the destination. For example, changes in the directory structure, virtual machine configuration (processor, memory, network adapter), cluster configurations, or the like are accounted for during the restore process.

In block 308, the local agent reports a status of the restore to the cluster agent. The cluster agent may also report a status of the restore to the backup server.

The backup and restore operations discussed herein can be independent of the physical node on which the virtual machine resides.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backing up a virtual machine in a cluster, wherein the cluster includes nodes and wherein the virtual machine resides on one of the nodes, the method comprising: registering a cluster agent with a backup server, wherein the cluster agent is a cluster resource of the cluster and wherein the cluster agent has an IP address and name that is independent of IP addresses and names of the nodes and virtual machines in the cluster and wherein the backup server is unaware of which node in the cluster the cluster agent resides on;
   receiving a workorder at the cluster agent from the backup server to perform a backup of a virtual machine, wherein the workorder identifies the virtual machine to backed up, wherein a location of the virtual machine or a node on which the virtual machine is operating is unknown to the backup server;
   querying the cluster, by the cluster agent to determine the location of the virtual machine;
   locating, by the cluster agent, the node in the cluster on which the virtual machine resides based on the workorder, wherein a local agent operates on the node on which the virtual machine resides, wherein the backup server is not required to know any names or addresses of nodes in the cluster, wherein the cluster agent represents the cluster as a single entity to the backup server and wherein the backup server communicates with the cluster agent during a backup operation or with the local agent after a backup operation is initiated;
   sending a workorder to the local agent, wherein the workorder is communicated to the local agent by the cluster agent; and performing a backup of the virtual machine.

2. The method of claim 1, further comprising determining the node in the cluster on which the virtual machine resides when the backup is actually performed such that the backup is performed even when the virtual machine has migrated within the cluster between a time that the backup operation was scheduled and a time that the backup operation was performed.

3. The method of claim 1, further comprising determining the location of the virtual machine by the cluster agent.

4. The method of claim 1, wherein performing a backup of the virtual machine includes the cluster agent coordinating with a local agent to perform the backup of the virtual machine, wherein the local agent resides on one of the nodes in the cluster.

5. The method of claim 1, further comprising performing the backup by generating a save set, wherein configuration information of the virtual machine and of the cluster are included in the save set.

6. The method of claim 1, further comprising reporting a status of the backup to the backup server.

7. The method of claim 1, wherein a name of the cluster agent is independent of names of hosts and of names of virtual machines in the cluster.

8. A method for restoring a virtual machine in a cluster that includes nodes, the method comprising:

sending a workorder to restore the virtual machine in the cluster to a cluster agent by a backup server, wherein the backup server is unaware of a location of the virtual machine in the cluster when the workorder is sent, wherein the cluster agent has an IP address independent of the nodes in the cluster such that the cluster agent can be contacted by the backup server regardless of which node the cluster agent resides on, wherein the backup server is unaware of which node in the cluster the cluster agent resides on, wherein the backup server is not required to know any names or addresses of nodes in the cluster, wherein the cluster agent represents the cluster as a single entity to the backup server and wherein the backup server communicates with the cluster agent during a restore operation or with the local agent after a restore operation is initiated;

determining, by the cluster agent, the location of the virtual machine in the cluster in response to the workorder by querying the cluster for the location of the virtual machine to be restored at a time of performing the workorder;

identifying a node in the cluster on which to restore the virtual machine as a destination for the virtual machine;

restoring the virtual machine on the node, wherein the virtual machine is restored from a save set stored by the backup server.

9. The method of claim 8, wherein identifying a node comprises identifying the node on which the virtual machine is instantiated when the virtual machine exists.

10. The method of claim 9, wherein identifying a node comprises identifying the node on which the cluster agent is instantiated when the virtual machine does not exist in the cluster.

11. The method of claim 8, further comprising communicating the workorder to a local agent associated with the identified node, wherein the local agent restores the virtual machine and communicates with the backup server to restore the virtual machine.

12. The method of claim 8, wherein the cluster agent coordinates restores for all virtual machines in the cluster.

13. The method of claim 8, further comprising adjusting a configuration of the save set prior to restoring the virtual machine to the identified node.

14. The method of claim 8, wherein the cluster agent is configured to migrate to other nodes in the cluster to ensure high availability of the cluster agent.

15. The method of claim 8, wherein the cluster agent is configured as a cluster resource and is configured to be contacted by the backup server regardless of which node the cluster agent resides on using the IP address.

16. The method of claim 8, further comprising restoring the virtual node by the local agent after the restore has been initiated by communication with the cluster agent, wherein the restore is independent of the node on which the virtual machine resides.

17. The method of claim 8, wherein the node on which the virtual machine is restored is: the node on which the virtual machine is located when the virtual machine exists prior to the restore; the node on which the local agent is instantiated; or the node on which the cluster agent is instantiated.

* * * * *